United States Patent [19]

Rasmason

[11] Patent Number: 5,365,220
[45] Date of Patent: Nov. 15, 1994

[54] WARNING ALARM DEVICE FOR AN EVAPORATIVE COOLER

[76] Inventor: Steven C. Rasmason, 5198 Cadenza Dr., Salt Lake City, Utah 84084

[21] Appl. No.: 941,230

[22] Filed: Sep. 4, 1992

[51] Int. Cl.⁵ ............................................. G08B 21/00
[52] U.S. Cl. .................................... 340/620; 340/618; 73/304 R
[58] Field of Search ................ 340/620, 618; 137/558, 137/392; 73/304 R; 62/127

[56] References Cited

U.S. PATENT DOCUMENTS

| | | | |
|---|---|---|---|
| 3,657,556 | 4/1972 | Foster | 73/304 X |
| 4,297,686 | 10/1981 | Tom | 340/620 X |
| 4,613,764 | 9/1986 | Lobato | 239/63 X |
| 4,879,902 | 11/1989 | Loniello | 340/620 X |
| 4,987,408 | 1/1991 | Barron | 340/620 X |
| 5,216,288 | 6/1993 | Greene | 340/620 X |

*Primary Examiner*—Jeffery A. Hofsass
*Attorney, Agent, or Firm*—Terry M. Crellin

[57] ABSTRACT

A warning device is disclosed for an evaporative cooler or swamp cooler. The alarm comprises a pair of closely spaced electrodes mounted at a desired position above the floor of a water reservoir in the evaporative cooler. During normal operation of the evaporative cooler, the electrodes are not submerged in the pater. Upon malfunction of the float valve in the water supply to the reservoir, uncontrolled amounts of water are added to the reservoir, and the water level rises. When the water level attains a specified depth, the electrodes become submerged in the water. An electrical circuit is associated with the electrodes, and when the electrodes become submerged in the water, the electrical circuit is closed. The closing of the circuit activates an audible alarm which can be heard by inhabitants in the building being served by the evaporative cooler. Preventive maintenance can then be undertaken before extensive damage is done by water overflowing from the water reservoir of the evaporative cooler.

3 Claims, 3 Drawing Sheets

WARNING ALARM DEVICE FOR AN EVAPORATIVE COOLER

BACKGROUND OF THE INVENTION

1. Field of the Invention

The present invention relates to evaporative coolers used in semi-dry climates for cooling of buildings such as residential homes. Such evaporative coolers are often referred to as swamp coolers. In particular, the invention relates to alarm devices for giving a warning alarm that the water level in the reservoir of an evaporative cooler has become sufficiently deep so that water is overflowing from the reservoir.

2. State of the Art

Evaporative coolers are used widely in semi-dry climates for cooling air which is being introduced through the cooler to a building. Water is distributed over pads in the housing of the evaporative cooler, and as relatively dry air passes through the wet pads water is evaporated. The evaporation of the water takes heat from the air and thus reduces the temperature of the air. In semi-dry climates, evaporative coolers are very efficient, low cost means for cooling the air within a building.

All evaporative coolers must have a reservoir of water that is used to recirculate over the pads through which the air passes. As the water is evaporated, the level of the water in the reservoir drops, and a float valve turns on to introduce make-up water to the reservoir through a water supply conduit.

The float valves are prone to malfunction, usually failing to close when the reservoir is properly filled thus allowing excess water to enter into the reservoir. Virtually all evaporative coolers are provided with an overflow tube that allows excess water to flow out of the reservoir. The overflow water usually flows on to the roof of the building on which the evaporative cooler is installed. The flow of water over the roof of the building causes ugly water marks on the roof and can eventually cause sufficient damage that the roof must be repaired.

Quite often, the overflow tube is insufficient in size to carry off all the excess water being introduced into the water reservoir by the malfunctioning float valve, such as when the overflow tube becomes partially blocked with debris. When this occurs, there is a high probability that the water level will rise sufficiently in the reservoir to leak into the interior of the building. Such water leaking into the interior of the building can cause major damage that is very costly to repair.

An extensive search of prior art patents relating to evaporative coolers indicates that the problems resulting from malfunctioning float valves have not been adequately addressed. There was no prior art found that relating to means for monitoring the level of water in the reservoir or an evaporative cooler or of giving a warning that excess water is being discharged from the evaporative cooler through the overflow tube. Without any warning of such a condition, the inhabitants of the building may delay for some time to determine that the evaporative cooler is malfunctioning. Overflow water in the mean time can be causing serious damage to the roof of the building or to the interior of the building when the overflow water is leaking to the interior.

Objectives

A principal objective of the invention is to provide a novel warning device that promptly gives an audible warning to the inhabitants of the building that excess water has accumulated in the reservoir of the evaporative cooler with the possibility that excess water is either being diverted to the roof of the building or is leaking into the interior of the building.

A particular objective of the present invention is to provide a relatively inexpensive warning device that is easily installed on an evaporative cooler to accurately and reliably determine when excess water has accumulated in the reservoir of the evaporative cooler, wherein the device utilizes two electrodes that are positioned a relatively small distance above the normal, working level of the water in the reservoir, and further wherein an electrical circuit is completed for activating an audible alarm when the two electrodes become submerged in excess water rising in the reservoir because of a malfunctioning float valve.

An additional objective of the present invention is to provide a warning device capable of giving an audible warning and to also activate a supplemental electrical component such as a solenoid switch for turning off electrical power to the evaporative cooler or a backup solenoid valve in the water supply conduit to stop water flow through the malfunctioning float valve of the evaporative cooler.

BRIEF DESCRIPTION OF THE INVENTION

The above objectives are achieved in accordance with the present invention by providing a novel warning alarm device for an evaporative cooler which comprises a pair of closely spaced electrodes and means for mounting the electrodes at a desired position above the floor of the water reservoir of the evaporative cooler. The pair of electrodes are spaced just above the normal, working level of the body of water contained in the reservoir. The normal working level of the body of water in the reservoir is below an overflow means associated with the evaporative cooler, and the pair of electrodes are preferably positioned so as to be located at an elevation between the normal working level of the body of water and the elevation at which water begins to flow out of the reservoir through the overflow.

When the float valve on the water supply conduit supplying make-up water to the reservoir malfunctions in the open condition so as to continue to allow water to flow into the reservoir whereby the water level exceeds the normal working level of the body of water in the reservoir, the rising body of water contacts the pair of electrodes. The water completes an electrical circuit through the pair of electrodes. A detector circuit responds to the completion of the electrical circuit through the pair of electrodes by activating an audible alarm. The detector circuit can be used to further activate a back-up solenoid valve in the water supply conduit to turn the solenoid valve off and stop the flow of water to the reservoir. In addition, the detector circuit can be used to activate solenoid switch that turns off all electrical power to the evaporative cooler.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE ILLUSTRATED EMBODIMENTS

Figure 1:
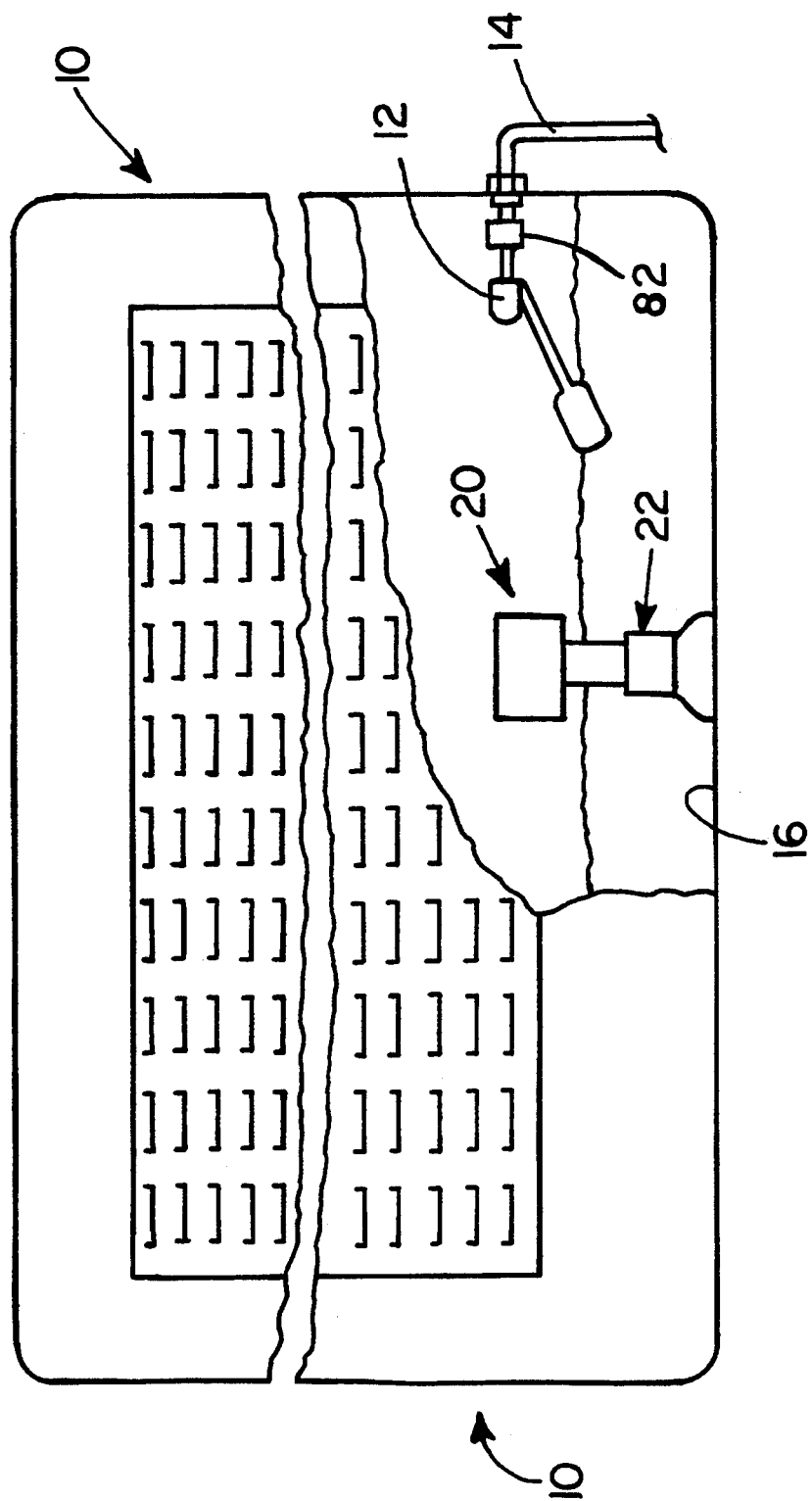
FIG. 1 is an elevational view of an evaporative cooler showing a portion of the housing of the cooler broken away to show the warning device of the present invention installed inside the evaporative cooler.

Referring now to FIG. 1 of the drawings, there is shown an evaporative cooler 10 which is also commonly called a swamp cooler. The operation of an evaporative cooler 10 is well known. Water is pumped from a water reservoir and is allowed to trickle down through porous pads positioned along the vertical sides of the evaporative cooler 10. Air is drawn through the porous pads and water from the pads is evaporated into the air. The evaporation cools the air and the cool air is then blown into the interior of a building or other structure that is to be cooled. The basic structure and operation of an evaporative cooler 10 is well known in the prior art and need not be further described herein.

The present invention provides a warning system for such evaporative coolers that will give an audible warning to those inside the building being serviced by the evaporative cooler 10. The audible warning is sounded whenever the water level in the water reservoir of the evaporative cooler 10 rises to a predetermined depth that is greater than the normal, operating depth of the water in the reservoir. The excessive water accumulation in the water reservoir is caused by the malfunction of the float valve 12 on the water supply conduit 14. It is recommended that the float valve 12 be changed yearly. However, most users allow the float valve 12 to be used until failure or malfunction occurs. Malfunction of the float valve 12 generally causes excess water to be fed to the reservoir. The excess water must then be vented from the reservoir to prevent leakage of the excess water into the building being served through the air duct of the evaporative cooler 10. The vented water generally passes through an overflow conduit onto the roof of the building inasmuch as evaporative coolers are generally installed on a roof of the building being served. The flow of water over the roof can stain and otherwise damage the roof. Any water leakage into the building being served can cause substantial, expensive damage.

The alarm system of the present invention provides an audible warning to the inhabitants of the building so that preventative maintenance of the evaporative cooler 10 can be undertaken before substantial water damage is done by the overflow of water from the evaporative cooler 10. As shown in FIG. 1, the warning device 20 of the present invention can be installed on the floor 16 of the water reservoir. As will be discussed further hereinafter, an adjustable stand 22 is provided to mount the operative elements of the warning device 20 above the normal, operating water level of the body of water in the water reservoir.

Figure 2:
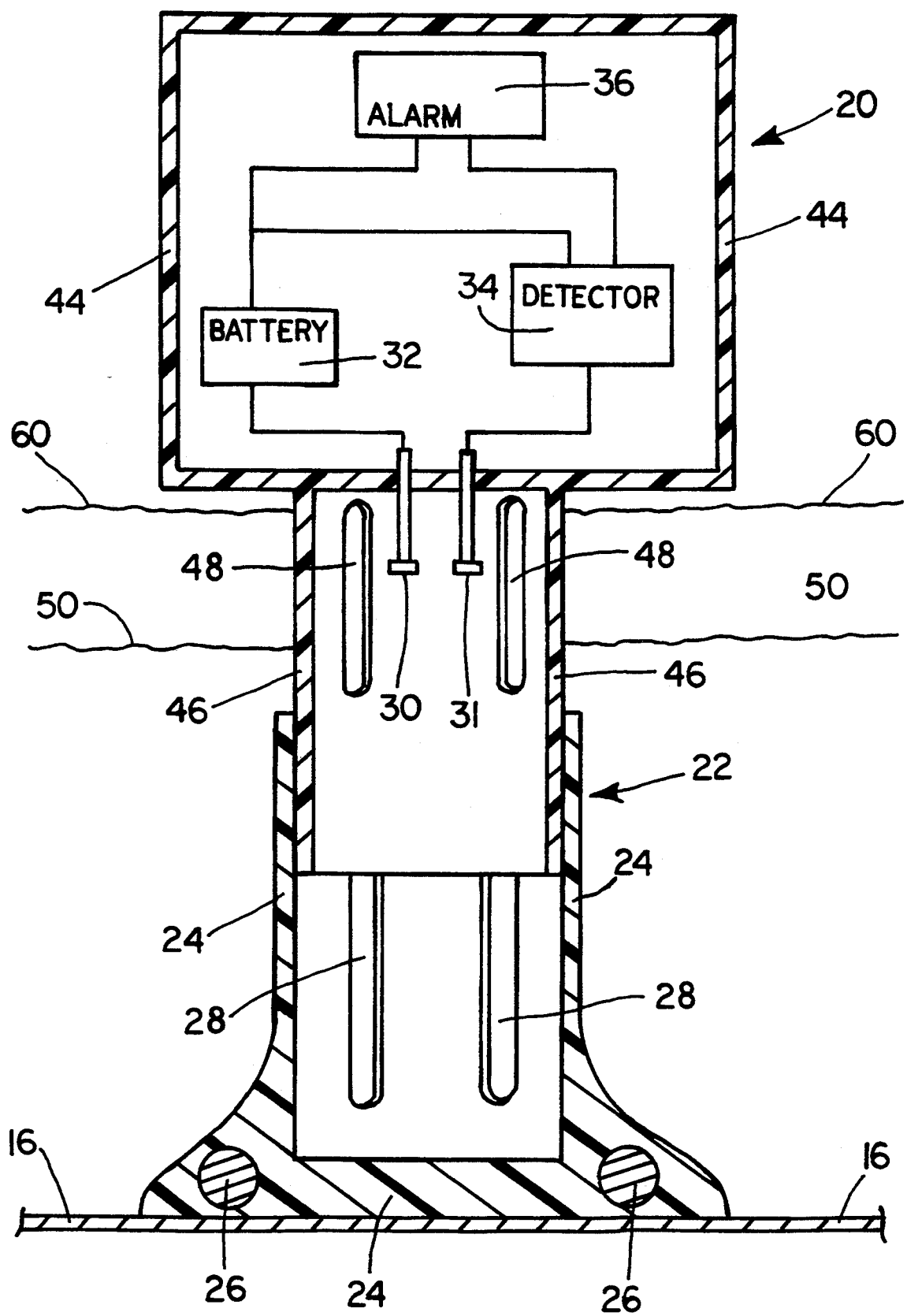
FIG. 2 is a diagrammatic cross section of the warning device of the present invention.

As is best illustrated in FIG. 2, the warning device of the present invention comprises a pair of closely spaced electrodes 30 and 31. Means are provided for mounting the electrodes 30 and 31 at a desired position above the floor 16 of the water reservoir of the evaporative cooler 10 such that when water in the reservoir attains a specified depth, the electrodes 30 and 31 will be submerged in the water.

In the preferred embodiment shown in the drawings and in particular in FIG. 2, the means for mounting the electrodes 30 and 31 consists of an adjustable stand 22 having a hollow base section 24. The base of the hollow base section 24 is adapted to rest on the floor 16 of the water reservoir. To aid in retaining and stabilizing the hollow base section 24, a weight 26, such as a metallic ring, is incorporated into a bell shaped portion of the base section 24. The base section 24 is preferably molded of a plastic material and the metallic ring or weight 26 is molded into the bell shaped portion of the base section 24 that rests on the floor 16 of the water reservoir.

The working elements of the alarm system of the present invention are preferably housed in a housing 44, and the housing 44 has a hollow projection 46 extending downwardly therefrom. The hollow projection 46 has a perimeter that is shaped and sized so as to fit snugly within the inside of the hollow portion of the base section 24. The hollow projection 46 can move in telescopic type movement up and down within the hollow portion of the base section 24, but the fit is snug enough or frictional means are provided such that when the hollow projection 46 is moved to a selected position it will maintain that position unless manually moved to another position.

The telescopic, adjustable movement of the hollow projection 46 allows the device of the invention to be set to various distances so as to accommodate various depths of water in reservoirs of diverse makes of evaporative coolers. The hollow projection 46 is adjusted as shown in FIG. 2 such that the pair of electrodes 30 and 31 extending into the hollow projection 46 from the housing 44 are positioned slightly above the normal working level 50 of the body of water in the reservoir. The pair of electrodes 30 and 31 are further preferably positioned so as to be slightly below the level 60 of water which can accumulate in the reservoir before water begins to overflow from the reservoir. The electrical circuit components and the alarm, as will be described hereinafter, are positioned in the housing 44 and are always positioned above the water level in the reservoir even when the water is at the level 60 wherein water overflows from the reservoir.

At least one elongate slot 28 is provided in the sidewall of the hollow portion of the base section 24. The slot 28 (preferably a plurality of slots spaced around the periphery of the hollow portion of the base section 24) allows water to enter the hollow interior of the hollow base section 24. Corresponding elongate slots 48 are provided in the hollow projection 46 to allow air or water, whichever may be the case, to move in and out of the hollow interior of the hollow projection 46.

During normal operation of the evaporative cooler 10, the float valve 12 on the water supply conduit 14 maintains the water in the reservoir at the normal, working level 50. If the float valve 12 malfunctions in the open position so as to allow uncontrolled amounts of water into the reservoir, the water level in the reservoir rises so as to finally reach the level 60 at which water overflows from the reservoir. As the water rises to the higher level 60, the electrodes 30 and 31 become submerged in the water, and electrical current can then pass from one of the electrodes to the other.

An electrical circuit contained in the housing 44 is connected to the electrodes 30 and 31, and when the electrodes 30 and 31 are submerged in water so as to allow current to flow from one electrode to the other, the electrical circuit activates an audible alarm that can be heard by inhabitants in the building being served by the evaporative cooler 10. Briefly, as shown in FIG. 2, the electrical circuit comprises a battery 32 that is connected to one of the electrodes 30. The other electrode 31 is connected to a detector means 34 that completes a circuit back to the battery 32 when current flows from the electrode 30 to the other electrode 31. The detector means 34 also provides current to an alarm means 36 which is connected between the detector means 34 and the battery 32. A plurality of small openings (not shown in the drawings) can be provided in the upper side of the housing 44 to allow the audible alarm to be heard by inhabitants of the building through the air duct connecting the evaporative cooler 10 with the interior of the building.

In its most elemental form, the detector means 34 can be a single electrical connector connecting the electrode 31 to the alarm means 36, with the alarm means being connected back to the battery 32. When the electrodes 31 and 32 are submerged in water, a circuit is maintained from the battery 32 through the electrodes 30 and 31 to the alarm means 36 and back to the battery 32.

Figure 3:
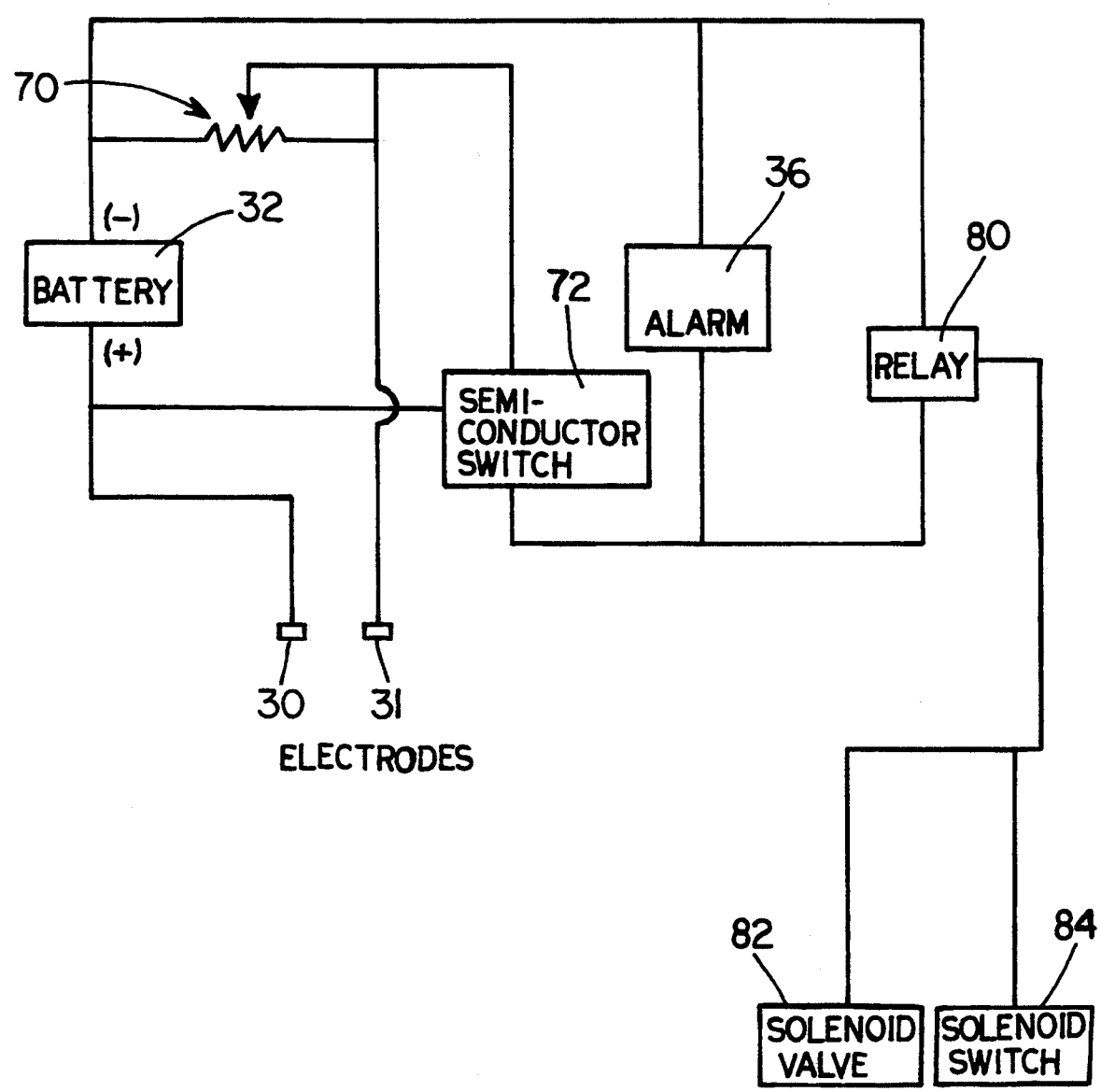
FIG. 3 is a block diagram of the electrical system of a preferred embodiment of the warning device of the present invention.

A more efficient detector system is preferably incorporated into an electrical circuit as illustrated in FIG. 3. In the circuit shown in FIG. 3, one of the electrodes 30 is connected to the positive pole of the battery 32. The other electrode 31 is connected through an adjustable, variable resistor 70 to the negative pole of the battery 32. A semiconductor device 72 is provided which has a gate connected directly to the other electrode 31. The other two connection of the semiconductor device 72 are connected to the positive pole of the battery 32 and a positive pole of a piezo buzzer alarm means 36. The negative pole of the piezo buzzer alarm means 36 is connected to the negative pole of the battery 32.

When the water level in the reservoir of the evaporative cooler 10 increases above its normal, working level 50 so that the electrodes 30 and 31 are submerged in the water, current flows from the positive pole of the battery through the variable resistor 70 to the negative pole of the battery 32. The voltage developed on the gate of the semiconductor device 72 triggers that device to complete an effective conduction of current through the other two connection of the semiconductor device 72. Current then flows from the positive pole of the battery 32 through the semiconductor device 72 and the piezo buzzer alarm means 36 back to the negative pole of the battery 32, with the piezo buzzer alarm means 36 emitting an audible alarm that can be heard in the building which is being served by the evaporative cooler 10.

The circuity of FIG. 3 can be modified as is well known in the electrical art to pulse the activation of the alarm means 36 so as to produce timed pulses of audible sounds. This would help identify the source of the sound by inhabitants of the building as well as conserve power drainage from the battery 32 such that the alarm could be generated for a longer period than could a continuous alarm before exhausting the battery 32.

As also shown in FIG. 3, an electrical relay means 80 can be wired so as to shunt the piezo alarm means 36. Current flowing through the relay means 80 would close the relay to activate a supplemental electrical component such as a solenoid valve 82 or a solenoid switch 84 when the electrical circuit through the electrodes 30 and 31 are submerged in water. The solenoid valve 82 is preferably located in the water supply line 14 just prior to the float valve 12 as shown in FIG. 1. When the solenoid valve 82 is activated, the valve would close to prevent further flow of water through the malfunctioning float valve 12. The solenoid switch 84 could be used to turn off electrical power to the evaporative cooler 10.

Although preferred embodiments of the alarm device of the present invention have been illustrated and described, it is to be understood that the present disclosure is made by way of example and that various other embodiments are possible without departing from the subject matter coming within the scope of the following claims, which subject matter is regarded as the invention.

I claim:

1. A warning alarm device for an evaporative cooler of the type having (a) an air duct connecting the evaporative cooler with an interior portion of a building being served by the evaporative cooler, (b) a reservoir for containing a body of water and (c) a water overflow that allows water to flow out of said reservoir whenever the body of water exceeds a preset depth in said reservoir, said device comprising a housing;

a hollow projection extending downwardly from said housing, said hollow projection having at least one opening provided in an upper portion thereof;

a pair of electrodes that are spaced apart from each other and extend from said housing so that distal ends of said electrodes are positioned within said hollow projection;

a base member that is adapted to rest on a floor of said reservoir;

a hollow member extending upwardly from said base member, said hollow member having at least one opening provided in a lower portion thereof;

said hollow projection on said housing and said hollow member on said base member being attached to each other so that said hollow projection can move up and down in telescopic type movement relative to said hollow member on said base member, and further so that said opening on said hollow projection and said opening on said hollow member are always exposed, whereby the distal ends of said electrodes in said hollow projection can be set at a desired position above the base member and the floor of said reservoir on which the base member rests so that when the body of water in said reservoir attains a specified depth, the distal ends of said electrodes will be submerged in the body of water;

an electrical circuit contained in said housing and connected to said electrodes, said electrical circuit being open when said electrodes are not submerged in said body of water and closed when said electrodes are submerged in said body of water;

audible alarm means attached to said housing; and means for activating said audible alarm means when said electrical circuit is closed so that an audible alarm is transmitted to the interior portion of the building being served by said evaporative cooler through the air duct connecting the evaporative cooler and the interior of said building.

2. A warning alarm device in accordance with claim 1 further comprising electrical relay means connected to said electrical circuit, with said electrical relay means being activated when said electrical circuit is closed to energize a solenoid valve in a water supply conduit that supplies water to the evaporative cooler, wherein when said solenoid valve is energized by said relay means, the solenoid valve closes to stop water from being supplied to said evaporative cooler from said water supply conduit.

3. A warning alarm device in accordance with claim 1 further comprising electrical relay means connected to said electrical circuit, with said electrical relay means being activated when said electrical circuit is closed to energize a solenoid switch that turns off electrical current to the evaporative cooler when said solenoid switch is activated by said relay means.

* * * * *